Nov. 26, 1940.                H. W. MENDE                2,223,261
                             CONVERTIBLE SEAT
                           Filed Aug. 2, 1938              2 Sheets-Sheet 1
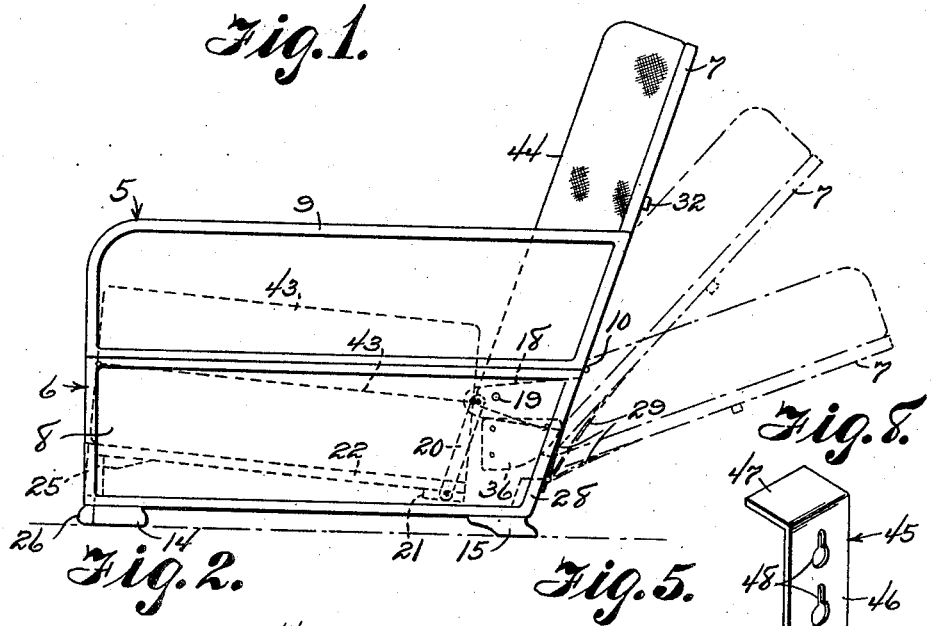
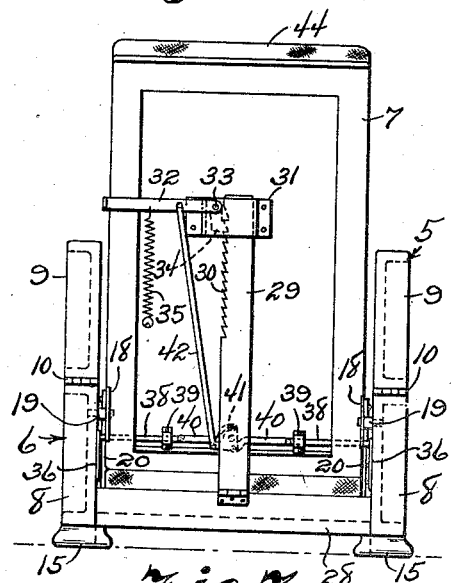
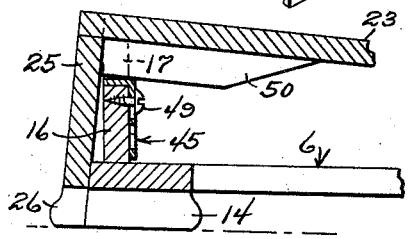
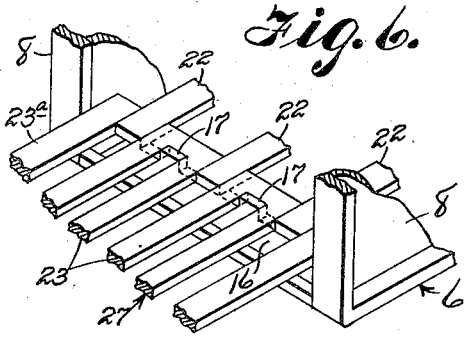
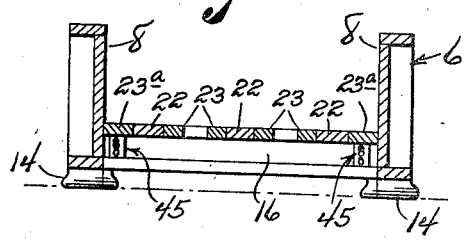
Harold W. Mende
INVENTOR
BY Victor J. Evans & Co.
ATTORNEYS

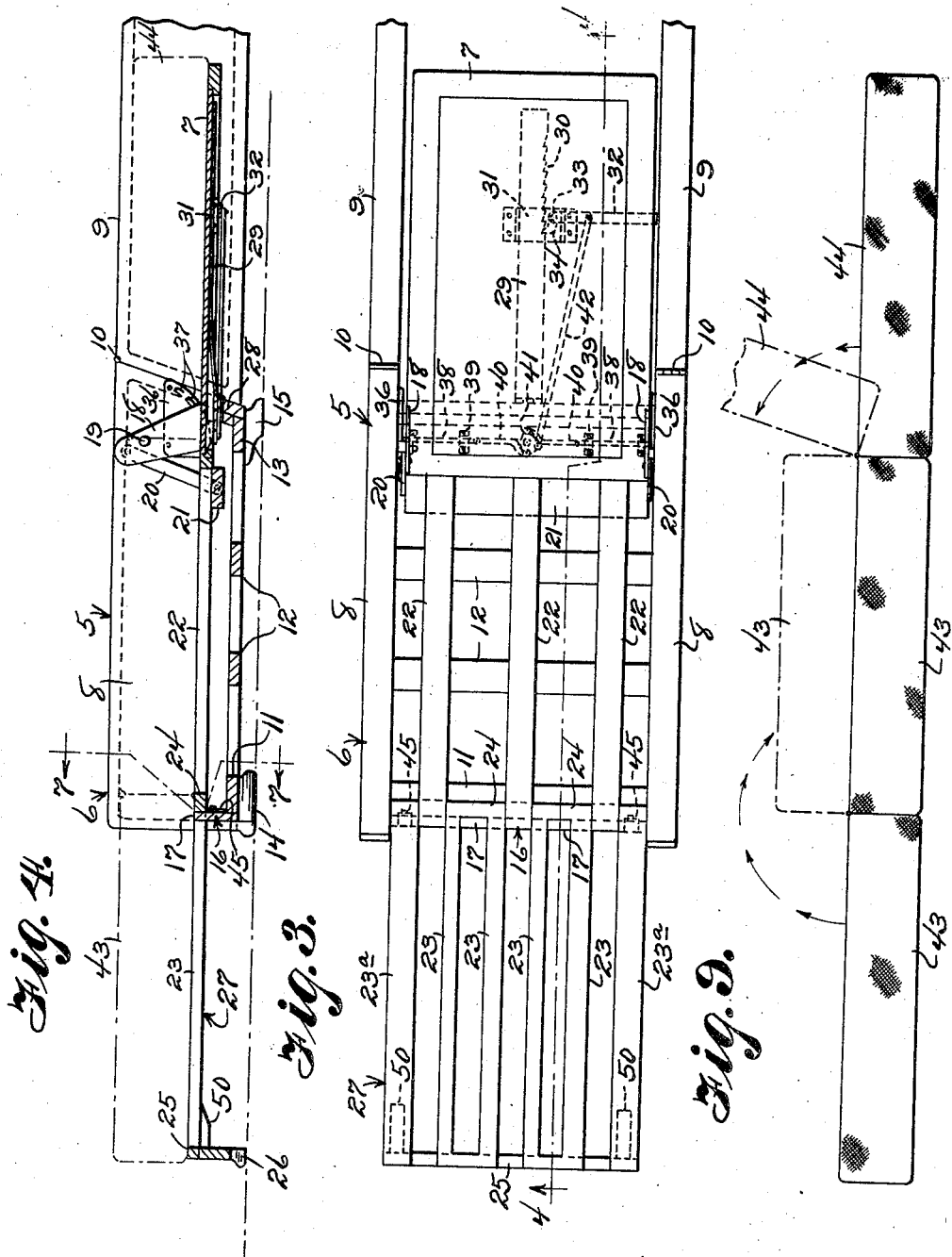

Patented Nov. 26, 1940

2,223,261

UNITED STATES PATENT OFFICE 2,223,261

CONVERTIBLE SEAT

Harold W. Mende, Flint, Mich.

Application August 2, 1938, Serial No. 222,722

1 Claim. (Cl. 155—49)

My invention relates to convertible seats and has for one of the principal objects thereof the provision of a seat so constructed and arranged whereby said seat may be conveniently and expeditiously converted into a comfortable full length bed.

Another object of my invention is to provide a seat assembly of the above described character which may be converted from seat position to bed position and vice versa with a minimum physical effort, and which is provided with means for maintaining the same in various seat adjusted positions.

A further object of my invention is to provide a seat assembly of the above described character which is simple in construction, durable in use, efficient in operation and economical in manufacture.

Other objects and advantages will be apparent from the following description, appended claim and annexed drawings.

Referring to the drawings wherein like reference characters designate like parts throughout the several views:

Figure 1 is a side elevation of my invention.

Figure 2 is a rear elevation thereof.

Figure 3 is a top plan view of my invention illustrating the latter in extended or bed position.

Figure 4 is a sectional view taken on the line 4—4 of Figure 3.

Figure 5 is a detail longitudinal section of the forward end of the device.

Figure 6 is a fragmentary detail perspective view of the forward end of the device illustrating the parts in extended position.

Figure 7 is a detail sectional view taken on the line 7—7 of Figure 4.

Figure 8 is a detail perspective view of one of the seat elevating members.

Figure 9 is a side elevation of the tierce of cushions employed in practicing the invention.

In practicing my invention I provide a seat assembly 5 equipped with a seat frame 6 having a pivoted back 7. The seat frame 6 comprises a pair of spaced sides 8 on which are pivoted arm rests 9 as at 10. Said sides 8 at the lower edges thereof are connected together by front, intermediate and rear transverse rails 11, 12 and 13 respectively. Both of the front and rear corners of said frame are provided with pairs of feet 14 and 15 respectively. Adjacent and outwardly of the front rail 11 said frame is fashioned with a transverse bar 16, the upper end of which is fashioned with a plurality of spaced projections 17 for a purpose hereinafter set forth.

The back 7 is hinged to the sides 8 by means of eccentrically mounted brackets 18 secured to said back and pivoted to said sides by means of pivot pins 19. The forward ends of said brackets have pivoted thereto the upper ends of downwardly extending links 20, the lower ends of which are pivoted to the ends of a transverse bar 21 disposed within the rear portion of said frame. Secured on the upper face of said bar 21 are the rear ends of a tierce of slats 22, the front ends of which rest upon the bar 16 and are adapted for relative movement therewith. Interposed between the slats 22 are pairs of spaced slats 23, the rear ends of which are connected together by cross pieces 24 adapted to engage the projections 17 and limit the outward movement of said slats 23 relative to said frame, it being understood that the projections 17 extend between the pairs of slats 23 as clearly illustrated in Figure 6. End slats 23a are interposed between the outer slats 22 and the sides 8. Said slats 23a and 23 are connected together at the front ends thereof by a transversely extending bar 25 equipped on the lower end corners with auxiliary feet 26. Said slats 23, 23a and bar 25 constitute an extension 27 adapted for extension and retraction between the sides 8 for a purpose hereinafter set forth. From the foregoing it will be apparent that when the back 7 is lowered from the position illustrated in full lines in Figure 1 to one of the dotted line positions therein or to the position illustrated in Figure 4, the brackets 18 will actuate the links 20 in a manner to raise the transverse bar 21 and slats 22 relative to the sides 8 and thereby dispose said slats 22 at a desired angle.

Adjacent the rear rail 13 and outwardly therefrom the frame 6 is provided with a transverse rear bar 28 to which is centrally hinged the lower end of an upwardly extending resilient rack member 29 fashioned on one side adjacent the upper end thereof with ratchet teeth 30. Said member 29 slidably extends within a housing 31 secured to the rear face of the back 7. Extending within said housing and laterally of said back is an operating lever 32, the outer end of which extends beyond the side of said back, the inner end being pivoted within said housing 31 as at 33 and fashioned with a dog 34 for engagement with said teeth 30 whereby, when said lever is actuated to disengage said dog from said teeth, said back may be lowered. A spring 35 is connected to said lever and said back and normally maintains the dog in engagement with one of said rack teeth 30 whereby to maintain said back in an adjusted position.

Secured on the inner faces of the sides 8 adjacent the pivot pins 10 are a pair of segmental plates 36 formed with teeth 37 adapted for engagement with the outer ends of a pair of aligned transversely extending rods 38 slidably mounted on the lower end of said back by means of brackets 39. The inner ends of said rods are pivotally connected to the outer ends of links 40, the inner ends of which are pivotally connected to a pair of ends of a triangular shaped plate 41 pivoted to said back.

The other end of said plate 41 is pivotally connected to the lever 32 without said housing 31 by means of a connecting rod 42 whereby actuation of the lever 32 to release the dog 34 from the rack 29 serves to move the rods 38 inwardly and disengage the outer ends thereof from engagement with teeth on said plates 36 to permit downward adjustment of the back. Release of the lever 32 to engage the dog 34 with one of the teeth 30 simultaneously effects engagement of the outer ends of said rods 38 with the teeth 37 of the plates 36 to limit the downward position of the back.

Obviously, when the parts are in the position illustrated in Figure 1, operation of the lever 32 serves to effect positioning of the back to a desired angular position relative to the sides, for instance that of a horizontal position as illustrated in Figure 4, and which movement at the same time, through the medium of the brackets 18, serves to elevate the slats 22 to a similar position. Thus, when the extension 27 is moved outwardly the same coacts with said slats 22 and back 7 to present a substantially horizontal bed surface.

As illustrated in Figure 9 of the drawings a tierce of hinged cushions are provided comprising a pair of seat cushions 43 and a back cushion 44. The seat cushions, when the back is in raised position, are folded one on the other and positioned on the slats 22 and extension 27 and the back cushion disposed on the front face of said back as illustrated in Figure 1.

When the parts are actuated to extended position to form a bed, the uppermost seat cushion is hinged outwardly to cover the extension 27 and thereby forms a mattress as clearly illustrated in Figure 9 of the drawings.

In some instances when the seat assembly is being used as a seat or chair it is desirable to elevate the front of the seat portion considerably higher than that of the rear and to effect an adjustment of this kind I provide a pair of adjusting members 45 comprising plates having vertical sections 46 terminating at the upper ends thereof in horizontally disposed sections 47. Said vertical sections 46 are provided with pairs of spaced inverted keyhole slots 48, the upper or lower ones of which are adapted to receive in the narrow portions thereof screws 49 detachably securing said plates to the bar 16 outwardly of the projections 17 and under the slats 23a of the extension 27 and said slats are provided at the front ends thereof with downwardly extending portions 50 for engagement with sections 47 of said plates. Obviously, by raising said plates the same may be readily detached from the screws 49 and raised or lowered in a manner to position the adjacent keyhole slots about said screws thereby raising or lowering the slats 23a as the case may be and a subsequent raising of the front end of the extension 27. When the seat assembly is disposed in bed position as illustrated in Figure 4 the arm rests 9 are pivoted backwardly in a manner to dispose the latter adjacent the sides of the back.

From the foregoing it will be apparent that I have provided a seat assembly having a bottom portion formed of slats, certain of said slats adapted to slide forward to form an extension and that the back of the device is hinged to the seat portion by means of eccentrically mounted bracket members which, when the back is lowered to reclining position, are adapted to raise the level of the seat portion to the level of the back and extension. Furthermore, the back is supported by a centrally disposed resilient rack member provided with a ratchet portion which coacts with a dog and operating rods which extend laterally of the frame and by means of which the back may be adjusted to any desired angle. The three cushions comprising the seat and back are hinged together at their upper edges so that the upper seat cushion may be swung outwardly upon the extension and the back cushion lowered with the back, thus forming a mattress for said assembly when adjusted for use as a bed.

What I claim is:

A device of the character described, comprising, a frame equipped with a movable bottom, a back eccentrically pivoted to said frame, said frame provided with sides extending upwardly from said bottom, a ternary of connected cushions arranged with one supported by said back and the others by said bottom in superposed relation, pivoted members connecting the back to the bottom for effecting movement of the bottom upon lowering of the back relative to said frame whereby to position said bottom in horizontal relation with the back, said bottom provided with an extensible section coacting with the back when in lowered position to form a bed, said cushions movable with respect to each other to effect disposal in end to end relation on said bed to constitute a mattress therefor, and arm rests pivoted to said sides and operable to horizontal positions with respect to said bottom for embracing said back when in lowered position and extending upwardly with respect to the back for coaction with said sides to preclude lateral displacement of said mattress from said bed.

HAROLD W. MENDE.